United States Patent [19]

Stewen

[11] Patent Number: 4,580,908
[45] Date of Patent: Apr. 8, 1986

[54] THERMOMETER FOR COKE OVEN CHAMBER WALLS

[75] Inventor: Wilhelm Stewen, Dortmund, Fed. Rep. of Germany

[73] Assignee: Dr. C. Otto & Comp. GmbH, Bochum, Fed. Rep. of Germany

[21] Appl. No.: 527,652
[22] PCT Filed: Dec. 4, 1982
[86] PCT No.: PCT/DE82/00228
   § 371 Date: Aug. 8, 1983
   § 102(e) Date: Aug. 8, 1983
[87] PCT Pub. No.: WO83/02156
   PCT Pub. Date: Jun. 23, 1983

[30] Foreign Application Priority Data

Dec. 7, 1981 [DE] Fed. Rep. of Germany ....... 3148314

[51] Int. Cl.$^4$ .......................... G01J 5/10; C10B 33/10
[52] U.S. Cl. ..................................... 374/130; 250/342; 374/103; 374/141; 374/139
[58] Field of Search ............... 374/141, 129, 125, 130; 250/352; 266/99, 97, 100; 201/1; 414/215, 212, 198; 198/738

[56] References Cited

U.S. PATENT DOCUMENTS

| 2,814,953 | 12/1957 | Callaghan | 374/125 |
| 3,101,618 | 8/1963 | Hance | 374/153 X |
| 3,345,873 | 10/1967 | Lellep | 374/125 X |
| 3,501,380 | 3/1970 | Perch | 414/198 X |
| 3,577,784 | 5/1971 | Kavacic | 374/141 X |
| 3,805,072 | 4/1974 | Goerens et al. | 250/342 |
| 3,998,616 | 12/1976 | Farabaugh | 250/342 X |
| 4,344,819 | 8/1982 | Gerdes, Jr. | 201/1 |
| 4,400,097 | 8/1983 | Koschnitzke et al. | 374/121 |
| 4,435,093 | 3/1984 | Krause et al. | 374/129 |

FOREIGN PATENT DOCUMENTS

| 1225143 | 9/1966 | Fed. Rep. of Germany | 414/198 |
| 2141711 | 3/1973 | Fed. Rep. of Germany | 414/198 |

Primary Examiner—Daniel M. Yasich
Attorney, Agent, or Firm—Thomas H. Murray; Clifford A. Poff

[57] ABSTRACT

Optical quotient thermometers are disposed on the operative end of pusher rods used to push coke from coke oven chambers. The actual value of the optical quotient temperature is measured by the thermometer on two closely-adjacent wavelengths and a quotient signal is produced from the top measured volumes which is converted in a measuring head secured to the pusher rod. An electrical signal is delivered by a converter in the measuring head by wires extending along the pusher rod to a point externally of the oven chamber to a recording and/or evaluating facility where the signal is recorded.

4 Claims, 3 Drawing Figures

THERMOMETER FOR COKE OVEN CHAMBER WALLS

BACKGROUND OF THE INVENTION

This invention relates to a thermometer for determining the temperature of coke oven chamber walls. More particularly, the present invention relates to supporting on the end portion of a pusher rod used to push coke from a coke oven, a thermometer which includes a measuring head wherein the actual value of the measured temperature is converted to an electrical signal and delivered by lines to a recording and evaluating facility which is external of the coke oven.

The coking of a coal charge in an oven chamber proceeds according to the temperature of the coke oven chamber walls. The chamber walls are heated by adjacent heating walls and the major surfaces of the chamber walls must be heated in a manner to yield uniformly-carbonized coke. The content of residual volatiles of uniformly-carbonized coke is the same throughout. The coke oven chamber walls must be supplied at every place with the amount of heat which is appropriate for that place by the combustion of heating gases to insure uniform carbonization. The heating gases flow vertically upward through flues in the heating walls. The gases burn to some extent at different heights in the flue with an excess of air. A large number of heating flues is formed by subdividing the heating walls; the effect of which is that the large quantities of gas fed to the flues can be controlled and distributed satisfactorily over the entire heating wall. The heating flues serve to control the quantity of heat supplied lengthwise of the heating walls, i.e., horizontal distribution, in accordance with the heat requirement which increases toward the coke side of the oven chamber because of the conicity of the oven chambers.

Another important consideration for insuring uniform heating of coke oven chamber walls is a vertically-uniform distribution to the intensity of the heat in every flue. Other important factors relate to the nature of the heating fuel. Uniform heating in the flue is promoted by lean-gas flames which are not long and not luminous. On the other hand, irregular heat distribution occurs with the use of rich gas which produces a short luminous flame in the heating flues. Various operating procedures are, therefore, required when heating with rich gas in order to obtain uniform heating. One such procedure is the distribution of gas nozzles in the various flues at different heights and inert gases, such as flue gases, are admixed with the gases for combustion or the combustion-supporting air is introduced in stages. In known types of coke ovens, different systems for feeding rich gas are responsible for a number of special procedures for insuring uniform heating. For example, in top-heated ovens, the heating gas is supplied from mains extending along the front of the ovens, i.e., along the top of the ovens. Rich gas flows into distribution ducts between the oven chamber and the associated regenerator. From this point, the rich gas is distributed to the various heating flues. Calibrated nozzle bricks situated in the burner plane are used for adjusting the quantity of gas required for each individual flue. Other special features are found in coke ovens having, for example, twin-heating flue systems for the so-called group draft ovens.

The most widespread method of supervising the heating of coke ovens is carried out on the basis of measurements of the temperature of the nozzle bricks in the heating wall flues. Operating staff using pyrometers measure the temperature at the side of the chamber wall which is distal from the coal charge. The temperature measurements are very labor-intensive and are not accurate for insuring uniform heating. The uncertainty as to the uniformity of heating wall temperature is the result of the distance between the temperature-measuring station or point and the chamber wall surface which is in contact with the coal. Uniform carbonization of coke depends mainly on a uniform temperature of the chamber walls particularly at the side thereof which is near the coal charge. Temperature measurements of the chamber wall surfaces are also made between fairly long intervals of time. The measurements can be made by the use of pyrometers in the charging apertures but this is a considerable disturbance to oven operation.

According to an earlier proposal disclosed in West German Patent Publication No. 3,045,508, the heating of chamber walls is checked by at least one pyrometer having an attached frontal optical system secured to a pusher rod used to push carbonized coke from each oven chamber. In front of the pusher rod there is a plate or shield which is moved through the chamber during the pushing of coke. By providing the front attached optical system in the pyrometer, the movement of the pusher rod insures that the optical system moves through the coking chamber. The optical system can detect the temperature of the entire width of the chamber wall surface. The optical system is disposed perpendicularly to the chamber walls, i.e., transversely to the longitudinal axis of the pusher rod.

The temperature of two opposing oven chamber wall surfaces is measured simultaneously by means of various pyrometers with frontal attached optical systems. This is effected by fixedly-installed optical systems; however, a movable optical system can be used. A movable optical system will be pivoted at intervals toward each of the opposite oven chamber wall surfaces to permit a temperature measurement after each pivotal movement. Temperature-measuring stations are, therefore, provided at each oven chamber wall corresponding to the intervals of pivotal movement by the optical system whereby the temperature-measuring stations are spaced apart from one another. The pivoting of the optical system is such that the interval between two adjacent temperature-measuring stations along any oven chamber wall surface does not exceed the spacing between the flues of the associated heating wall.

In another embodiment disclosed in West German Patent Publication No. 3,045,508, two pyrometer measuring stations are provided each with an associated optical system, one system for each oven chamber wall surface. Each optical system is secured to the pusher rod approximately at a distance equal to the height of the coal charge so that the temperature at the top end and bottom of the oven chamber wall surface can be measured. This arrangement is useful for measuring any unwanted vertical temperature drop along the oven chamber wall surfaces for coke ovens in which the heating gases flow vertically upward through the heating flues.

Instead of two stationary pyrometers for each oven chamber wall surface, a single pyrometer can be moved vertically with the optical system or a further pyrometer having an optical system can be provided to form additional measuring stations in addition to the two stationary pyrometers for each oven chamber wall surface. The vertically-movable optical system can be used to provide any desired number of measuring places in the vertical direction. Similarly, a large number of required measuring stations for temperature measurements in the vertical direction of the oven chamber wall can be provided by a corresponding number of stationary optical systems.

The optical system includes an optical cable surrounded by a cooling jacket. A heat-resistant quartz window is disposed in front of the optical cable. The quartz window can be further protected against excessive heating by exending the cooling jacket forwardly beyond the optical cable. The cooling jacket can be heat-resistant and includes provisions for cooling by water or air. When cooling with air, part of the air which is supplied to the cooling jacket may be directed toward the quartz window. The issuing cooling air cools the window and clears away dust and coal particles. Possible soiling of the quartz window can be obviated if the pyrometers are quotient pyrometers.

SUMMARY OF THE INVENTION

It is, therefore, an object of the present invention to provide means for enabling the checking of the heating of coke oven chamber walls with a very reduced labor force and very accurately in connection with every manipulation of the coke oven on the side of the heating walls near the coal charge.

More particularly, according to the present invention, there is provided a thermometer device for the coke oven chambers wherein secured to a pusher rod for the oven chamber is a measuring head which includes a built-in converter. Preferably, the measuring head has a water feed line and an air feed line. One or both of these lines cool the wiring extending to the measuring head.

The aim of this invention is to convert the heat radiation into measurement signals directly on the pusher rod, i.e., the heat radiation received by the optical system at the operative end of the pusher rod is converted into an electrical signal directly at the operative end of the pusher rod instead of conducting the radiation through an optical cable. Preferably, a preamplifier for the electrical signal is ued. The electrical signal is conducted by flexible cables to an evaluation facility and converted therein into a recorded diagram. The measuring head is disposed near the operative end of the pusher rod and comprises the optical system, a preamplifier and a thermometer to measure the temperature in the measuring head. The measuring head may trigger a warning signal when critical permissible temperatures are exceeded. The entire measuring head is continuously cooled with water which is drawn from a supply tank and flows through the measuring head and thence the water is circulated through air coolers. According to the present invention, the supply and discharge lines for the water to cool the wiring are disposed either adjacent the wires or extend thereabout along part of the wires that is exposed to the atmosphere.

These features and advantages of the present invention as well as others will be more fully understood when the following description is read in light of the accompanying drawings, in which.

Figure 1:
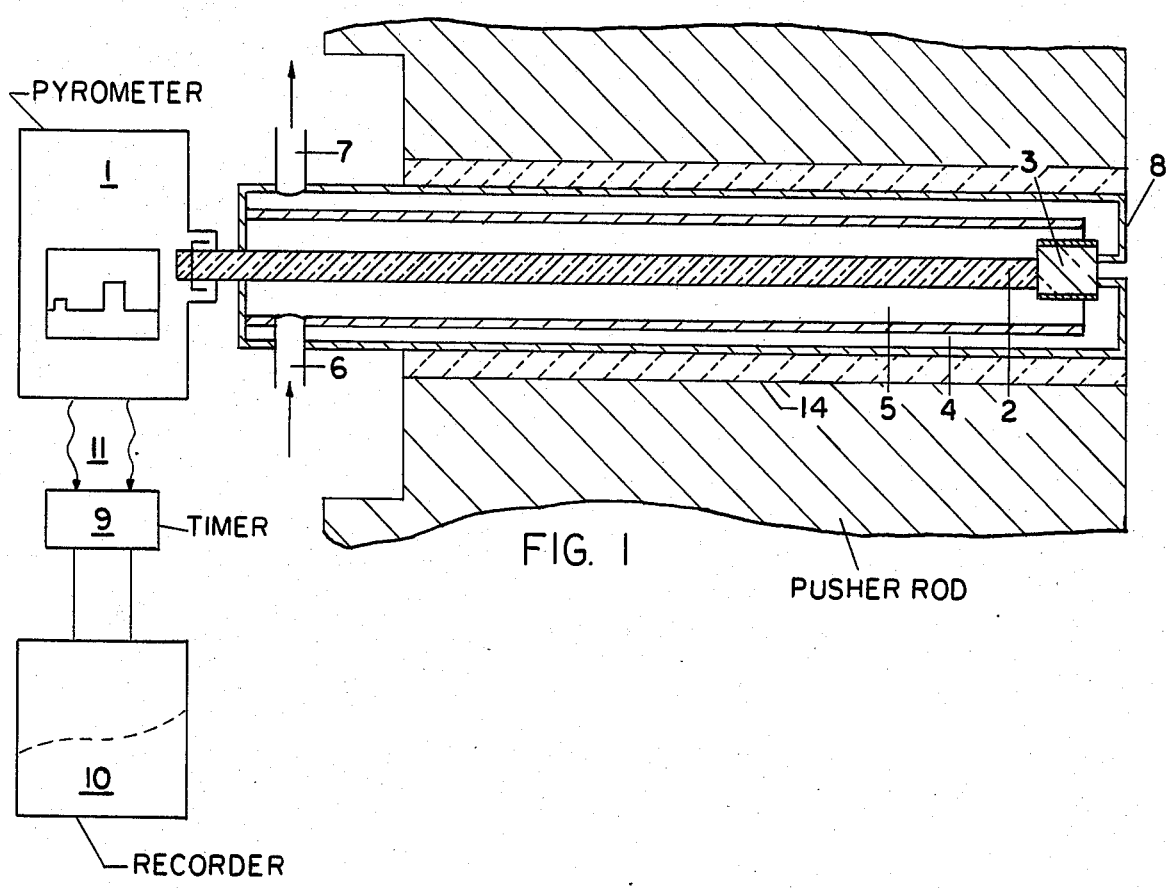
FIG. 1 is a diagrammatic view of a temperature measuring device according to the West German Patent Publication No. 3,045,508, using a quotient pyrometer.

Referring to FIG. 1, four pyrometers have front attachments forming optical systems and are secured to a pusher rod P. Spacers that are poor heat conductors are used to form the connection to the pusher rod. When the pusher rod has a hollow interior, the optical cable can extend inside the rod. Two pyrometers each having a frontal attached optical system, are disposed opposite one another on either side of the rod with their optical systems facing away from one another and perpendicularly away from the rod toward the vertical plane of the coke oven chambers. Two opposite pairs of quotient pyrometers and optical systems are secured to the pusher rod in vertically, spaced-apart relationship such that a temperature measurement is made at the top and bottom of the oven chamber wall surfaces.

Each pyrometer is a quotient pyrometer 1. The optical system associated with each pyrometer is a glass fiber optical conductor 2 having a window 3 made of quartz or some other heat-resistant, transparent material in front of the glass fiber optical conductor. Each quotient pyrometer 1 is secured to the pusher rod end which is distal from the coke-pushing plate or shield. The length of optical conductor 2 is sufficient so that its front end associated with the window 3 terminates a short distance behind the shield at the front end of the rod. The optical conductor 2 comprises a number of adjacent glass fiber cables each having an internal diameter of approximately 1 millimeter. There are five such cables in the embodiment shown in FIG. 1 and the window 3 is adhered to the glass fiber cables. Instead of five separate glass fiber cables, a single glass fiber cable having an internal diameter of 5 millimeters can be used. Cooling of five separate cables is more satisfactory than cooling of a single thicker cable. The glass fiber cables are flexible and readily accept bending of the front end which is associated with the shield. In the drawing, the front end of the conductor 2 is shown without bends for the sake of simplicity. The function of bending of the conductor is to measure radiation issuing perpendicularly of an oven chamber wall surface and for subsequent temperature measurements.

The quartz window can withstand temperatures of 400° C. and has a thickness between 3–10 centimeters. The window can be reliably adhered to the optical conductor 2 by adhesives which can withstand temperatures of up to 300° C. The optical conductors are situated within a jacket made of HYTREL (Trademark) which can withstand temperatures of up to approximately 150° without damage to the glass fiber cables inside the jacket. A cooling jacket 4 made of VA-steel extends over the whole length of that part of the optical conductor 2 which is moved into the coke oven chamber together with the pusher rod during coke-pushing operation. The jacket 4 has a narrower-diameter inner tube 5 which forms a gap between the conductor 2 and the inner tube 5. A gap is also formed between the inner tube 5 and the outer jacket of the cooling jacket 4 to permit the flow of a coolant, water in the present instance, which enters through line 6 and is discharged through line 7. As illustrated in FIG. 1, line 6 terminates at the inner tube 5 so that the coolant is compelled to flow first along the optical conductor 2 and thence the coolant issues from the inner tube 5 at window 3 and flows along the outside of jacket 4 to the discharge line 7. The cooling jacket 4 has a portion 8 which extends forwardly beyond the window 3, thus insuring special cooling of the window.

While not shown in FIG. 1, another embodiment is disclosed which provides that the cooling jacket 4 is devoid of the inner tube 5 and discharge line 7. Air or some other gaseous coolant is introduced through the supply line 6 and issues at the end of the jacket 4, which extends forwardly beyond the window 3, where exit apertures are located. This feature insures continuous cooling and cleaning of dirt from the window. Air for cleaning the window can be supplied to one jacket and cooling water to a second jacket. A coating of $ZrO_2$, asbestos or other appropriate material on a ceramic base 14 projects the jacket 4 against corrosion.

Because of the rugged operating conditions associated with coke ovens, the window end of the optical system also has side plates to provide mechanical protection in the lateral direction. Also, at the end of the optical conductor 2 near the converter, i.e., at the end of conductor 2 near the quotient pyrometer, an optical coupler is provided to facilitate replacement of the optical conductor in the event of damage. This requirement necessitates a releasable connection in the cooling jacket 4 and/or a releasable connection to the pusher rod. The quotient pyrometer 1 is rigidly disposed at the pushing site. The quotient pyrometer is designed for measuring wavelengths of from 0.7 to 1.4$\mu$ for temperature ranging between 650° C. and 1400° C. or 800° C. and 1800° C. Quotient pyrometers are optical thermometers in which temperature is measured on two closelyadjacent wavelengths, a quotient being formed from the two measured values. There is, therefore, a considerable reduction in error due to the emission factor. Also, quotient pyrometers greatly reduce the effect of soiling of the optical system, i.e., of the window 3, by water vapor and the like.

A timer relay 9 as shown in FIG. 1 operates the pyrometer 1 at intervals of time. The relay 9 is controlled in response to the consumption of current during the coke-pushing operation. The measured temperature values derived from the intervals of temperature measurement are recorded by a recorder 10 which can be a printer. The timer relay 9 and recorder 10 are stationary relative to the moving pusher rod. Flexible lines 11 having an automatic coiling facility, not shown, form the required flexible connection between pyrometer 1 and timer relay 9. The recorder 10 is positioned in the drive cab of the coke-pushing machine.

During each coke-pushing operation, a contactless surface temperature measurement is made by each quotient pyrometer 1 at the start of consumption of current by the coke-pushing machine and at intervals of time determined by the timer relay 9. The wall surface temperature in the coking chamber is usually between 1000° C. and 1300° C. The actual oven temperature is between 900° C. and 1100° C. The pyrometer 1 is calibrated from a body of known radiation for the radiation from the coke oven walls. Calibration is referred to as calibration of the measuring facilities.

Figure 2:
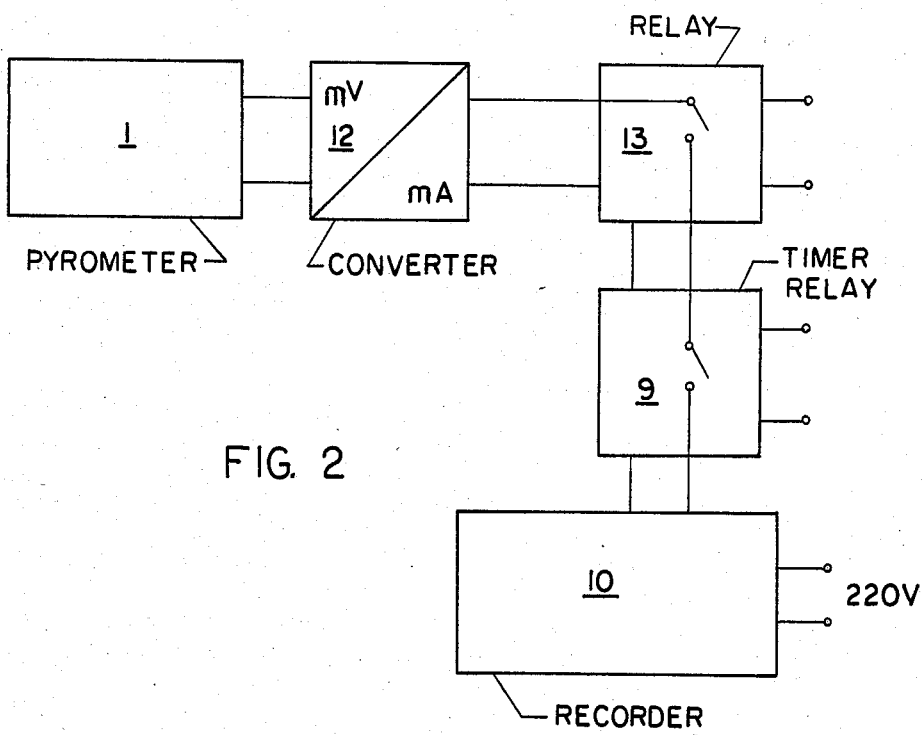
FIG. 2 is a schematic diagram for the quotient pyrometer used in FIG. 1.

As more completely shown by the schematic diagram of FIG. 2, the measurement of temperatures by the pyrometer 1 produces voltages which are converted to current in a converter 12, the output of which is between 0 and 20 milliamperes. The output from the converter 12 is fed to the recorder 10 which operates on 220 volt alternating current, 50 hertz. The timer relay 9, a pulse transmitter, and a relay 13 are interposed between the printer 10 and the converter 12. The relay 13 is energized by the flow of current to the pushing machine at the start of the pushing operation. The relays 9 and 13 operate on 240 volt alternating current, 50 hertz. The pulse output from timer 9 is in the range of between 0 and 20 seconds and set in the embodiment at 2 seconds.

The temperature measuring system is operated during each individual coke-pushing operation to record a temperature profile. The heating of the coke oven chamber surface in contact with the coal is checked and, therefore, a much more thorough temperature measurement is obtained than by conventional temperature measurements. Any manipulation of the heating for a single coke oven is accompanied by a temperature profile recording. This obviates the uncertainties of the accuracy of conventional manual temperature measurements and the uncertainties produced by such temperature measurements. The accuracy and speed of temperature measurement are very high. The printer 10 produces a diagram. The diagram can be immediately used by the person in charge of the heating of the coke oven chamber and used directly to check the heating and as a basis for corrections. Mechanical temperature measurements obviate a number of manual operations and provide considerable rationalization.

DESCRIPTION OF THE PRESENT INVENTION

Figure 3:
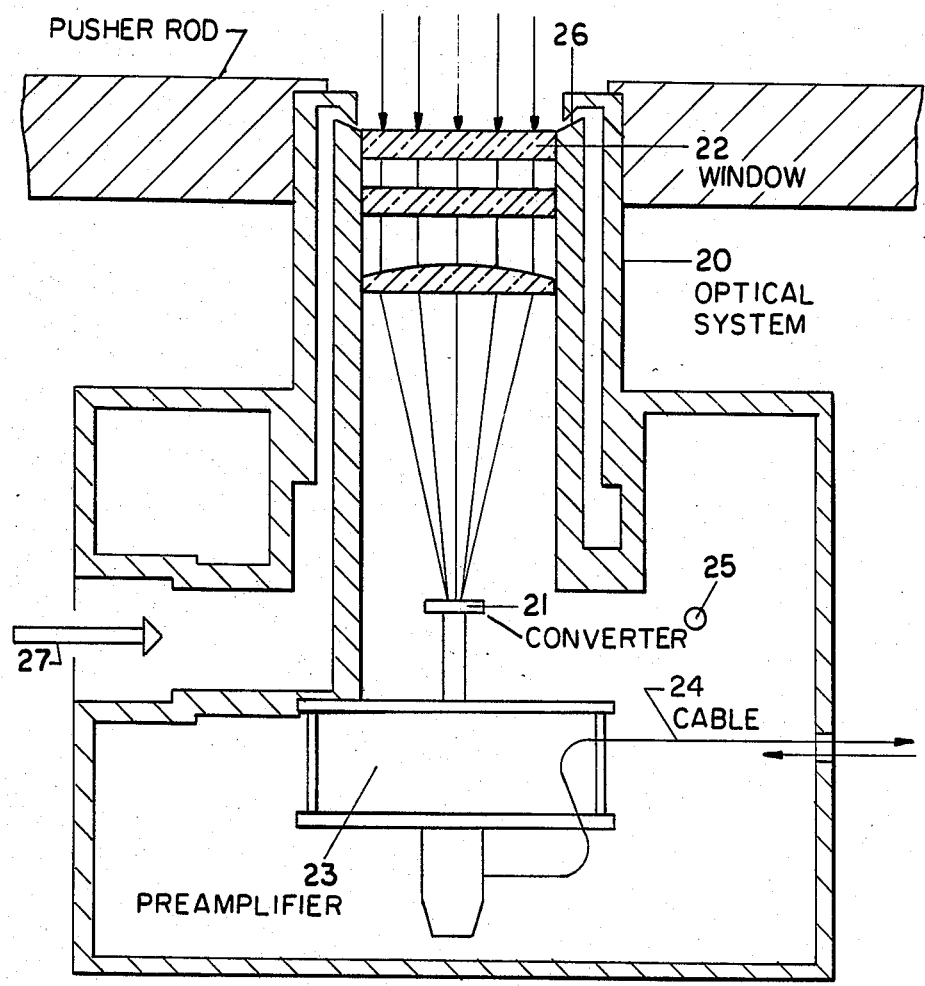
FIG. 3 illustrates an optical system according to the present invention in which a pusher rod carries a converter or temperature detector for converting the received radiation to an electrical signal.

FIG. 3 illustrates a temperature measuring head according to the present invention. The measuring head includes an optical system 20 and a converter or temperature detector 21 for converting the received heat radiation into a current signal. The measuring head is disposed on the end of the pusher rod such that a window 22 of the optical system receives heat radiation in the same way as window 3 receives heat radiation as illustrated by FIGS. 1 and 2 and described hereinbefore. The system 20 concentrates the heat radiation incident through window 22 on the converter 21 which can be of any kind of temperature detector, such as a quotient pyrometer or, in its simplest form, a thermocouple. The converter 21 delivers a current signal corresponding to the received heat radiation to a preamplifier 23 wherein the signal is amplified. The preamplifier is disposed on the measuring head. The amplified current signal is delivered by a cable 24 to a signal evaluation facility which operates in the same manner as the signal evaluation facility shown in FIG. 2 and described hereinbefore. A diagram from a recorder, not shown, is one of the items associated with the evaluation unit. The measuring head according to the present invention has a temperature detector which is responsive to the temperature in the measuring head. This temperature detector triggers a warning in the event the critical permissible temperature has been exceeded.

The entire measuring head is continuously cooled with water. The water is drawn from a supply tank by a pump and flows through the measuring head and thence through air radiators or coolers and then recirculated. The circulating discharge of water is about 100 liters per minute. The measuring head has a water inlet 25 and a water outlet line, both of which have a corrosion-proof jacket of VA-steel near the pusher rod. The water inlet and outlet lines extend along the pusher rod to the measuring head. The measuring head is air-cooled by air issuing from a ring nozzle 26 at window 22 to cool the window and simultaneously clean dust and dirt from the window. The air line extends with the water discharge and supply lines along the pusher rod.

An electric cable 24 forms the fourth line that extends from the measuring head. Cable 24 is a six-core electric cable which supplies current to amplifier 23 and receives the measurement signal and a signal from the temperature detector in the measuring head. Cable 24 is flexible and has an armoured covering or sheathing of PTFE (polytetrafluoroethylene) to provide heat insulation when the line 24 is exposed to heat radiation. The armouring or sheathing of the cable also provides insulation against the cooling water when the cable is disposed in the water supply or discharge line. A polytetrafluoroethylene sheathing on cable 24 can withstand temperatures up to 400° C.

The cable 24 can be cooled by air instead of being cooled by the cooling water for the measuring head. Air cooling can be provided in a similar manner to the water cooling. If line 24 is disposed separately on the pusher rod, a protective tube is also provided for this line. The supply of air to the measuring head is identified in FIG. 3 by reference numeral 27. All of the supply lines after leaving the pusher rod either cease to have protective tubes and like line 24 are, per se, flexible. If the lines are flexible, they can be coiled on drums. Preferably, spring drums are used for this purpose. There is a connection from the drums to the corresponding supply systems. Air is taken from a compressor used for pneumatic locking of the coke oven doors. A supply of air is delivered from a solenoid valve which is energized after the pusher rod starts to move. A limit switch on the pusher rod for controlling the supply of air and the start-up of the evaluation unit is triggered by the initial movement of the pusher rod. At the start of pusher rod movement, the evaluation unit, i.e., recorder or plotter, is started. A second limit switch operates when the pusher rod is immediately in front of the coke cake and provides an output signal to slow down the rate of recorder operation to insure that the resulting diagram has a sufficient spread for measurement accuracy. The pump for the cooling circuit preferably operates on direct current at, for example, 12 volts, so that it can be supplied by a battery in the event of a power failure.

The measuring spot by the optical system is 1 centimeter and the operating range is a 0.9-millimeter wavelength. Variations to the distance between the optical system and the wall surface of the coke oven chamber do not affect the accuracy of measurement. Such variations are caused, for example, by the pusher rod.

Although the invention has been shown in connection with certain specific embodiments, it will be readily apparent to those skilled in the art that various changes in form and arrangement of parts may be made to suit requirements without departing from the spirit and scope of the invention.

I claim:

1. A temperature measuring means carried on a coke pusher rod for a coke oven chamber, said temperature measuring means including a measuring head on one end of said pusher rod, said measuring head having therein a temperature detector exposed by an optical system to concentrated heat radiation incident on an optical window of said rod for producing a signal corresponding to the received heat radiation from the coke oven chamber, said measuring head further including amplifier means receiving said signal for delivering an output signal to an evaluation unit remote to said coke pusher and said coke oven chamber, the output signal corresponding to varying amounts of heat radiation incident on said optical window, and coolant supply means connected to supply coolant to said measuring head.

2. The temperature measuring means according to claim 1 wherein said coolant supplying means includes a feed line for supplying water and a feed line for supplying air to said measuring head.

3. The temperature measuring means according to claim 2 further comprising wiring extending from said measuring head, and wherein said feed line for supplying water extends to said measuring head and cools said wiring.

4. The temperature measuring means according to claim 2 further comprising wiring extending from said measuring head, and wherein said feed line for air extending to said measuring head cools said wiring.

* * * * *